United States Patent [19]

Kim

[11] 4,067,772
[45] Jan. 10, 1978

[54] ROD-SHAPED COMPONENTS BETWEEN FUEL ELEMENTS OF BOILING-WATER REACTORS

[75] Inventor: Jong-Dok Kim, Erlangen, Germany

[73] Assignee: Kraftwerk Union Aktiengesellschaft, Mulheim (Ruhr), Germany

[21] Appl. No.: 725,525

[22] Filed: Sept. 22, 1976

[30] Foreign Application Priority Data

Sept. 30, 1975 Germany .............................. 2543626

[51] Int. Cl.² ............................................ G21C 17/00
[52] U.S. Cl. .................................. 176/54; 176/19 R; 250/390
[58] Field of Search ..................................... 176/54–56, 176/86 R, 19 R, 19 J, 19 EC, 36 R, 50; 250/390, 391

[56] References Cited

U.S. PATENT DOCUMENTS

| 3,565,760 | 9/1971 | Parkos et al. ........................ 176/56 |
| 3,574,059 | 4/1971 | Sodergard ........................ 176/86 R |
| 3,650,895 | 3/1972 | Sodergard ........................ 176/54 |

FOREIGN PATENT DOCUMENTS 1,102,235  2/1968  United Kingdom ............. 176/86 R Primary Examiner—Harvey E. Behrend
Attorney, Agent, or Firm—Herbert L. Lerner

[57] ABSTRACT

A reactor core of a boiling water nuclear reactor having core cells respectively formed of fuel elements, a rod-shaped component disposed in a space between corners of encased fuel elements of four adjacent core cells, and sleeve-like spacer members slid onto the rod-shaped component and axially spaced from one another, the spacer members having a respective eccentric portion braced successively against at least respective different ones of the fuel elements of the core cells.

6 Claims, 5 Drawing Figures

ROD-SHAPED COMPONENTS BETWEEN FUEL ELEMENTS OF BOILING-WATER REACTORS

The invention of the instant application relates to rod-shaped components, such as core flux measuring tubes or carrier tubes for neutron sources, which are disposed between the corners of encased, preferably square fuel elements of four adjacent core cells of boiling-water reactors. Slot-shaped spaces remaining between the fuel elements, and also constituting space wherein control rods of cruciform cross sections are movable, are traversed by non-boiling cooling water. The flow of cooling water serves, among other things, for cooling the rod-shaped components wherein the core flux measuring devices or neutron sources can be accommodated. However, the flow of coolant causes vibrations in these tubular components, which may lead to damage of the adjacent fuel element casings. Such damage can cause premature shutdown of the entire nuclear reactor installation, not to mention that the fuel element casings, which are normally not subject to wear, can no longer be used for the further arming or charging of a reactor plant with fuel elements, as originally intended. The problem therefore arises of eliminating as far as possible vibrations of the rod-shaped components and thereby preventing damage to the fuel element casings from the outset. It is extremely difficult to achieve this solely by a particular guidance of the coolant flow, so that other possible constructions had to be sought after.

It is accordingly an object of the invention to provide rod-shaped components between fuel elements of a boiling-water reactor which avoid the foregoing disadvantages of the heretofore known constructions of this general type.

With the foregoing and other objects in view, there is provided in accordance with the invention, in a reactor core of a boiling water nuclear reactor having core cells respectively formed of fuel elements, a rod-shaped component disposed in a space between corners of encased fuel elements of four adjacent core cells, and sleeve-like spacer members slid onto the rod-shaped component and axially spaced from one another, the spacer members having a respective eccentric portion braced successively against at least respective different ones of the fuel elements of the core cells. The spacers are thus disposed so that they are braced in axial direction alternatingly against the adjacent fuel element casings. A detuning of the dynamic properties of the rod-shaped components is thereby achieved, so that excitation of vibrations or fluttering in the coolant flow is no longer possible.

It is unnecessary to vary the construction of the rod-shaped components per se. The assembly of the spacers is conceivably simple. They are slid over the rod-shaped components and the location thereof on the rod-shaped component is reliably secured by a spring clamp fit, which can be supplemented additionally by tack welding. Rotation-oriented insertion of the rod-shaped components is unnecessary because, due to the wide shape of the eccentric, contact thereof with at least one fuel element per spacer is always assured.

In accordance with another specific feature of the invention, the eccentric portion is constituted by a corresponding thickening of the wall of the sleeve-like spacer member, the thickened wall portion having respective bevels extending in both axial directions of the spacer member.

In accordance with a further feature of the invention, the spacer sleeve is formed with at least one slot at a location thereof beyond or other than at the eccentric portion.

In accordance with the alternate features of the invention, the rod-shaped component comprises a core flux measuring tube or a carrier tube for a source of neutrons.

In accordance with a concomitant feature of the invention, the fuel elements have a substantially square cross section.

Other features which are considered as characteristic for the invention are set forth in the appended claims.

Although the invention is illustrated and described herein as embodied in rod-shaped components between fuel elements of boiling-water reactors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
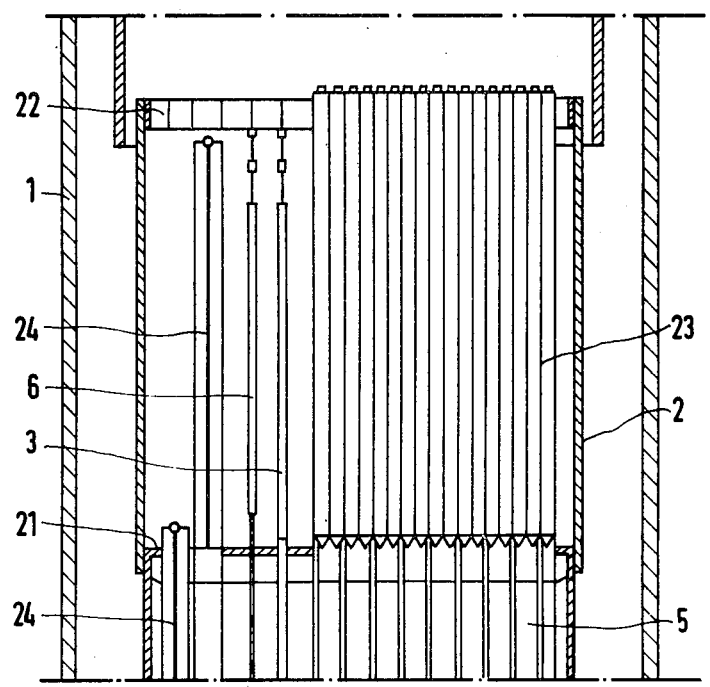
FIG. 1 is a fragmentary longitudinal sectional view of the core region of a boiling-water reactor.

Referring now to the drawing and first, particularly, to FIG. 1 thereof, there is shown within a reactor pressure vessel 1, a core casing 2 which surrounds the region of the reactor core proper, namely that of fuel elements 23. The fuel elements 23 are mounted on a head member of control rod guide tubes 5, that are positioned in a lower core grid or support 21, and are guided in an upper core grid or support 22. A coolant flows through the fuel elements 22 from the bottom to the top thereof, and evaporates in the process. In spaces between the fuel elements 23, tubular components, such as core flux measuring tubes 3 and neutron sources 6, for example, are located at given points. In addition, as mentioned hereinbefore, the control rods 23 are moved in the intermediate spaces; the control rods 23 are displaceable into the ractor core through control rod guide tubes by non-illustrated conventional control rod drive mechanisms below the reactor pressure vessel.

Figure 2:
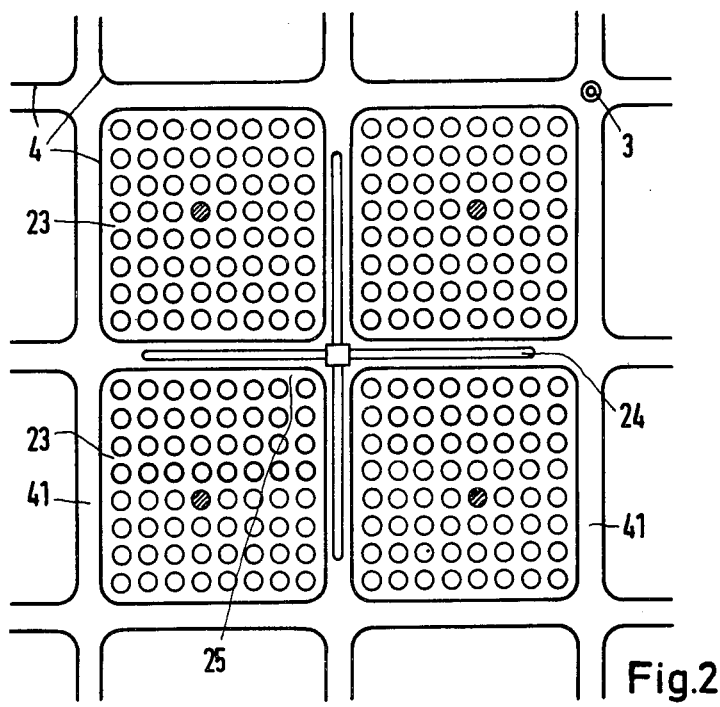
FIG. 2 is an enlarged diagrammatic cross sectional view of a core cell.

Respective groups of four fuel elements 23 each form so-called core cells 25 as shown diagrammatically in cross section in FIG. 2. Between the individual fuel elements 23, which are surrounded by a casing 4, slot-like spaces 41 remain, wherein a control rod 24 of cruciform cross section can move. At specific corners, tubular conponents 3 are also accommodated in these slot-like spaces 41 and are supposed to be prevented from vibrating in the coolant flow within the spaces 41.

Figure 3:
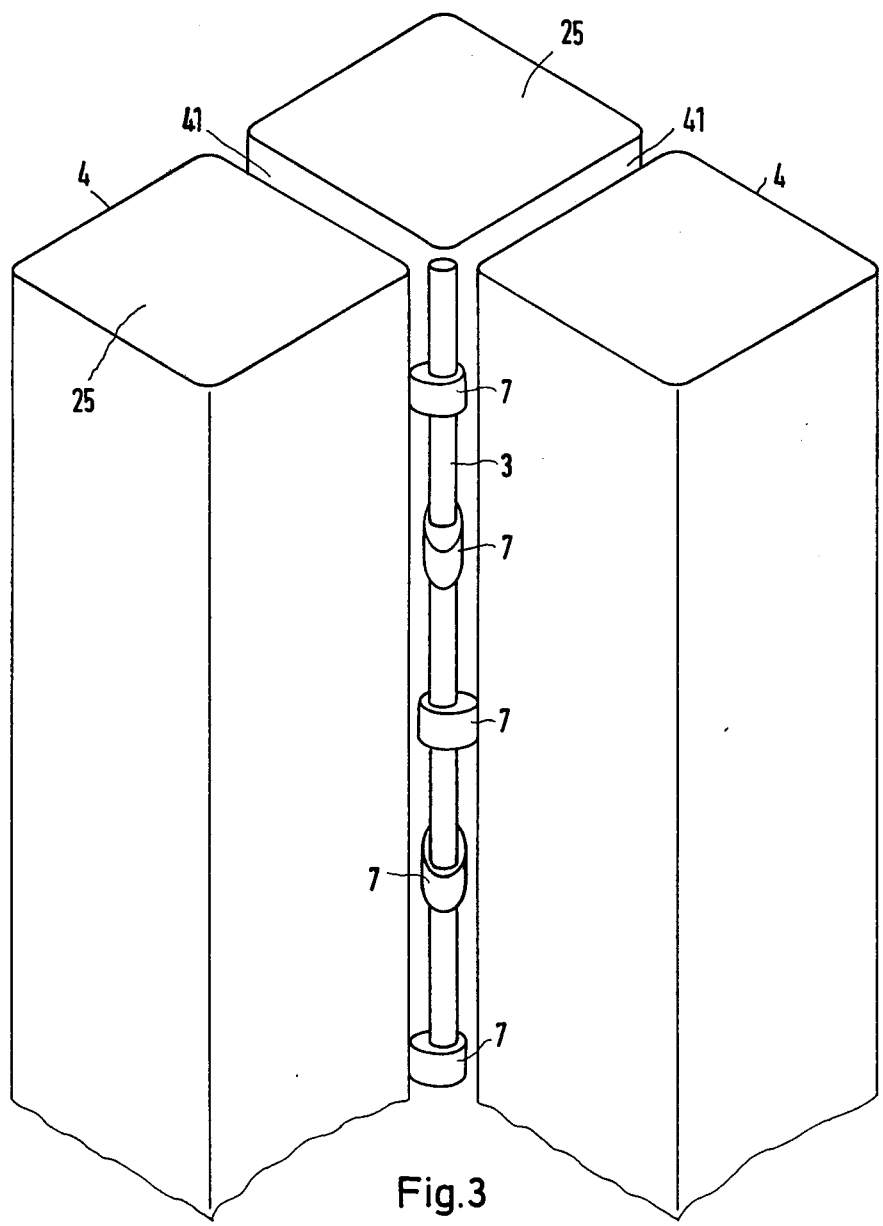
FIG. 3 is a perspective view of the core cell of FIG. 3 with one of the fuel elements thereof removed so as to show a tubular component equipped with spacers constructed in accordance with the invention.

In the perspective view of FIG. 3, the location of the rod-shaped components 3 between the fuel element cans or casings 4 can be seen. Spacers 7 are slid onto the rod-shaped components 3, and are braced alternatingly by eccentric portions thereof against the adjacent fuel element casings 4. By means of this bracing support, the resonant or characteristic frequency of the components 3 is shifted so that no excitation to vibration by the coolant flow can occur any longer. Damage to the contact points of the spacers 7 at the fuel assembly cans 4 is thereby prevented, so that the latter can be used again for the next new fuel elements after burn-up of the nuclear fuel. The spacer sleeves 7 are initially held fast only by friction and can be secured, as mentioned, hereinbefore, by spot-welding. One possible embodiment thereof is shown in FIGS. 4 and 5.

Figure 4:
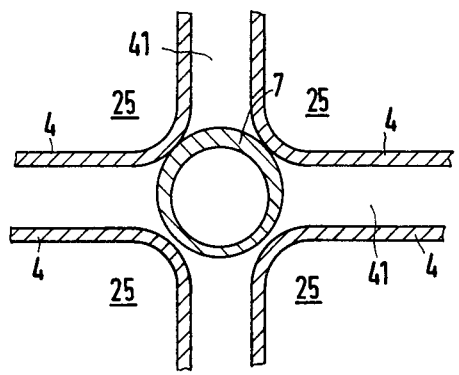
FIG. 4 is an enlarged fragmentary cross-sectional view of FIG. 3 showing the position of a rod-shaped component with a spacer between the corners of four fuel elements of respective core cells.

FIG. 4 illustrates in cross section the opposite corners of the fuel elements cans or casings 4 and a rod-shaped component 3 as well as a spacer sleeve 7 slid thereon. The spacer sleeve 7, as aforementioned, has an eccentric portion which engages two fuel element cans 4 simultaneously. The detailed construction of this eccentric spacer sleeve 7 is illustrated in FIG. 5. The spacer sleeve 7 is formed of a tubular part 71, which is formed at both ends thereof with axial slots 72 and in the middle thereof with an eccentric portion 73, having bevels 74 extending in axial direction. These bevels 74 facilitate the introduction of fuel element bundles during loading of the reactor, and also facilitate the flow of the coolant. The flow pressure of the coolant is therefore virtually negligible as far as the stressing of the component 3 is concerned.

Figure 5:
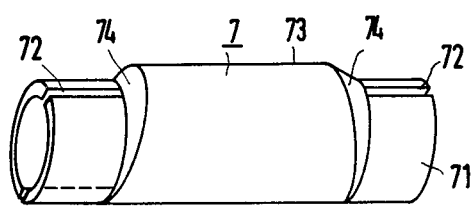
FIG. 5 is a perspective view of the spacer of FIG. 4.

The slots 72 shown in FIG. 5 can, of course, also have a different disposition; thus, for, example, one slot may extend over the entire length of the spacer. It is important only that this component 7 be provided thereby with a given amount of springiness or resilience, which facilitates the installation or attachment thereof at the point of assembly. Regardless of the type of fastening of the spacer sleeves 7, however, it is important that the eccentric 73 have such a width that, in every radial position thereof, it is located opposite the corner of at least one fuel element casing 4 or engages the latter.

In order to provide an idea of the physical size of these parts, it might be mentioned that in actually constructed spacers, the diameter of the rod-shaped component 3 was about 19 mm. The wall thickness of the tubular part of the spacer sleeve was about 1 mm, and the width of the slot also about 1 mm. The overall length of the spacers was 60 mm, and the length of the respective slotted parts 10 mm. The eccentricity 73 was about 2 mm. These measurements depend, of course, upon the respective spatial relationships or conditions in the reactor core and therefore represent no limitations as to the form of the spacer.

In conclusion, it should be noted further that the spacings of the individual spacer sleeves 7 depend upon the material and the dimensions thereof and thus, upon the resonant or characteristic vibration behavior of the rod-shaped component 3 and are best determined in the inserted condition, with respect to the damping effect thereof.

There are claimed:

1. In a reactor of a boiling water nuclear reactor having core cells respectively formed of fuel elements, a rod-shaped component disposed in a space between corners of encased fuel elements of four adjacent core cells, and sleeve-like spacer members disposed on the rod-shaped component and axially spaced from one another, said spacer members having a respective eccentric portion braced successively against at least respective different ones of the fuel elements of the core cells.

2. In a reactor core according to claim 1, wherein said eccentric portion is constituted by a corresponding thickening of the wall of said sleeve-like spacer member, the thickened wall portion having respective bevels extending in both axial directions of said spacer member.

3. In a reactor core according to claim 1 wherein said spacer sleeve is formed with at least one axial slot at a location thereof other than at said eccentric portion.

4. In a reactor core according to claim 1 wherein said rod-shaped component is a core flux measuring tube.

5. In a reactor core according to claim 1 wherein said rod-shaped component is a carrier tube for a source of neutrons.

6. In a reactor core according to claim 1 wherein said fuel elements have a substantially square cross section.

* * * * *